Jan. 29, 1946. P. R. GOLDMAN 2,393,898
MANUFACTURE OF TUBULAR STRUCTURES
Original Filed Aug. 7, 1942 2 Sheets-Sheet 1
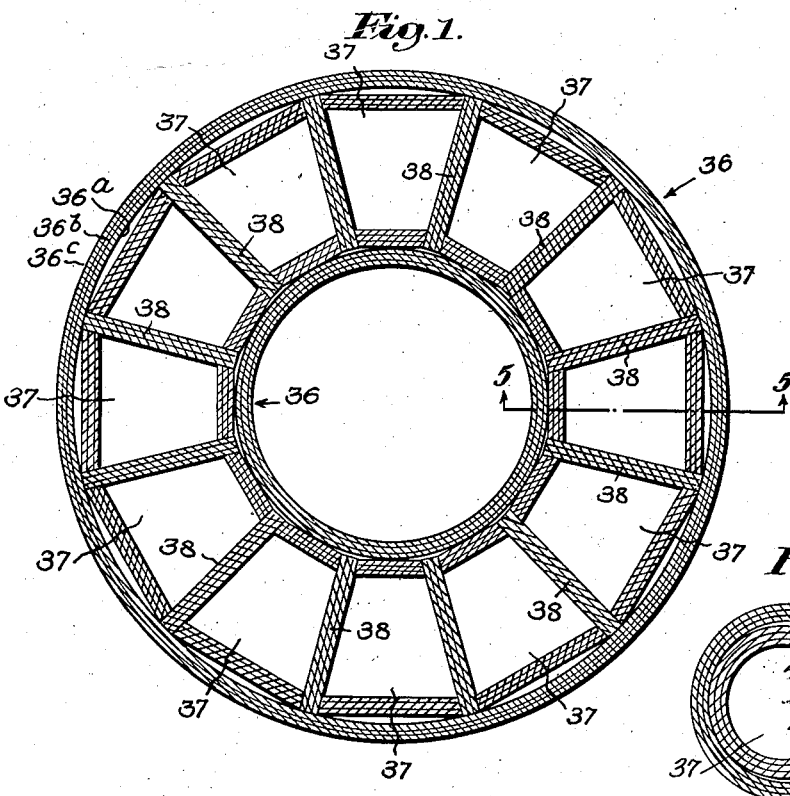
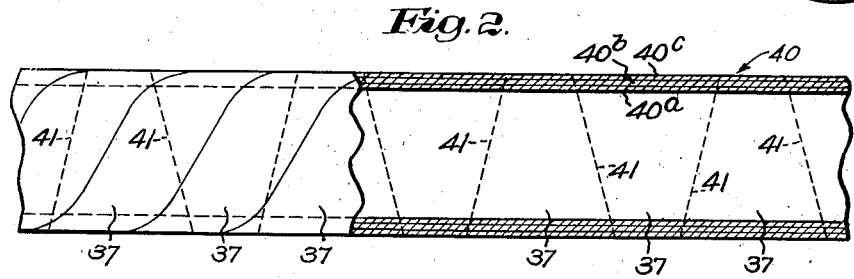
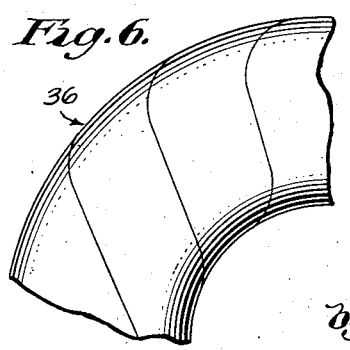
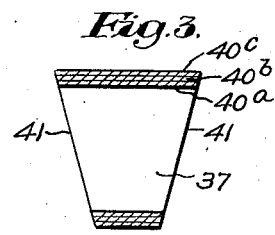
Inventor
Paul R. Goldman
by Emery, Booth, Townsend, Miller & Weidner
Attys.

Patented Jan. 29, 1946

2,393,898

UNITED STATES PATENT OFFICE 2,393,898

MANUFACTURE OF TUBULAR STRUCTURES

Paul R. Goldman, Andover, Mass., assignor to Plymold Corporation, Lawrence, Mass.

Original application August 7, 1942, Serial No. 453,931. Divided and this application March 2, 1943, Serial No. 477,728

3 Claims. (Cl. 144—309)

My present invention relates to the manufacture of tubular structures susceptible of a wide range of use and particularly adapted to serve as floating supports, pontoons, floats, and the like. More particularly the invention aims to provide novel methods of making such devices and structures from available materials, chiefly wood, veneer and plywood, and whereby the products may include various arcuate, circular, angular or other non-rectilinear portions, adapting them to use for example as the supporting means for life nets, rafts, preservers and for various other purposes.

This application is a division of my copending application Serial No. 453,931, filed August 7, 1942, now Patent No. 2,334,619.

In the drawings illustrating typical manufacturing methods in accordance with the invention:

Fig. 1 is a diametral cross-section of a curvilinear tubular structure as a whole, in accordance with the method of the invention, the product in this instance having a continuous uniform curvature providing a substantially circular structure of the general form of the usual annular life-preserver;

Fig. 2 illustrates certain steps in the formation of core sections or tubular elements in the practice of the method;

Fig. 3 shows one such tubular element separately, in longitudinal section;

Fig. 5 is a cross section taken radially of the product of Fig. 1, as for example upon line 5—5 thereof; and Fig. 6 is a side elevation of a portion of the outer casing of Fig. 1 or Fig. 4.

Figure 4:
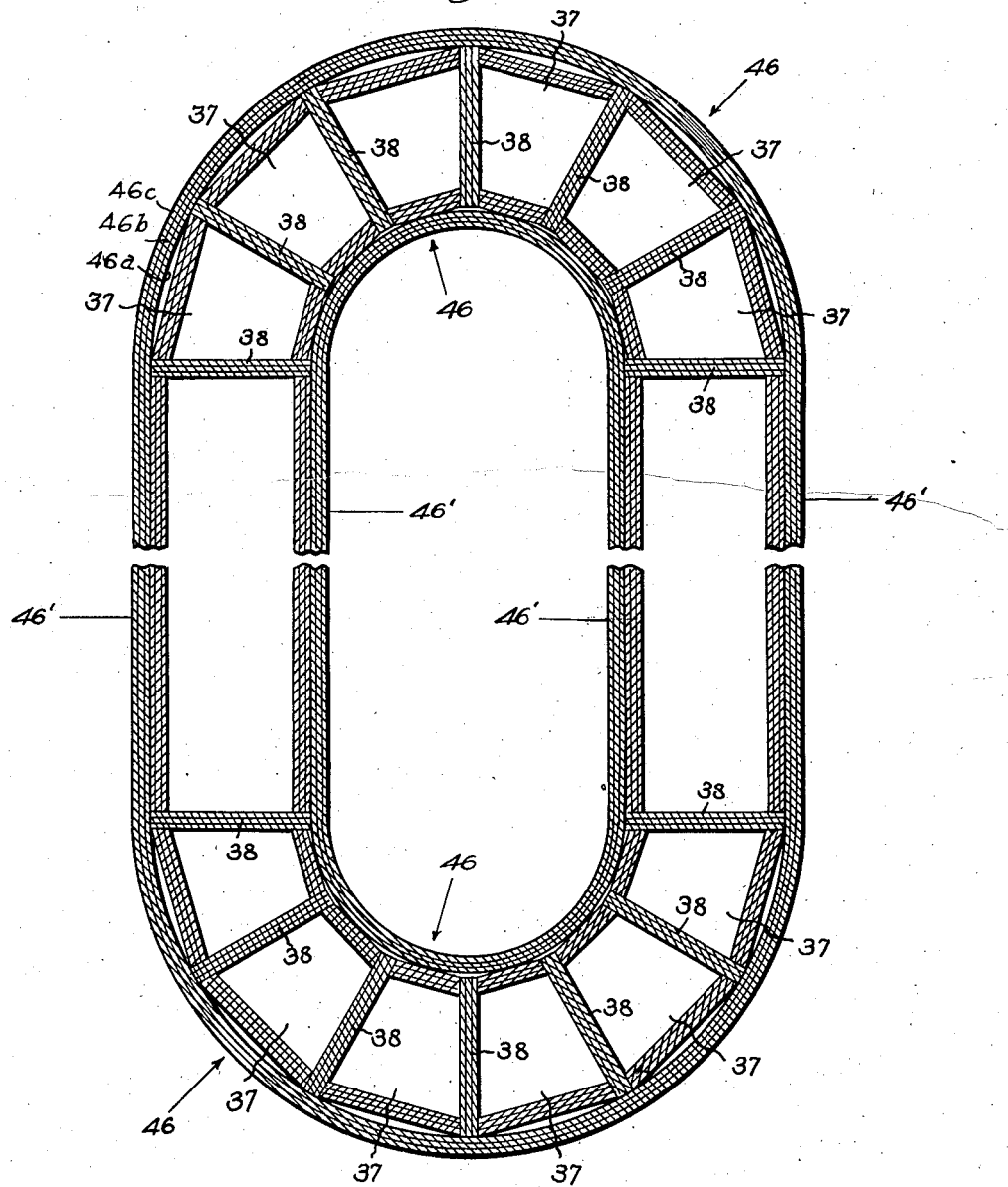
Fig. 4 is a view correspondingly to Fig. 1 further illustrative of the method involved.

As more fully disclosed in the parent application Serial No. 453,931 and in my copending application Serial No. 448,819, the structures with which the present method is concerned comprise casings or bodies of circular cross-section and which are formed of thin wood strip material, wood veneer or plywood wound into tubular form.

Such wound lamellar veneer tubular element is represented as a whole, with reference to the Fig. 1 structure, by the numeral 36, and with reference to the modified structure of Fig. 4, by the numeral 46. Each comprises a plurality of veneer windings or layers, such as 36a, 36b, 36c of Fig. 1 and 46a, 46b, 46c of Fig. 4 of spirally wrapped wood veneer strip material laid one upon another and bonded together by adhesive or cementitious agents, preferably of a thermoplastic or other polymerizable plastic type, such as urea formaldehyde and phenolic glues, compositions of the Tego type and other known agents adapted to effect a strong sealing union of the several elements and to render them substantially water- and moisture-proof and impermeable to air. Each of the wound elements such as 36a, 36b, 36c may itself comprise plural plies or spiral windings of the thin wood strip material individually bonded together, each such plural ply element being cured or set in the presence of heat and pressure as appropriate for the particular bonding agent, or the whole lamellar tubular wall element such as 36 or 46 being treated and set in a single curing operation.

It is an object of the present method to provide a compartmental or sectionalized structure for such tubular veneer element or casing 36 where the latter has a curved, arcuate or angular form, such as the fully circular structure of Fig. 1 and the less than 360° arcuate portion of Fig. 4.

In accordance with such method the curvilinear portions of the body element or casing, which include the entirety thereof in the example of the Fig. 1 casing 36, are subdivided into sections or compartments defined by inner tubular elements 37. These latter comprise lengths of tubular wound veneering. One of them is shown separately in Fig. 3, in longitudinal section.

Under the method of the present divisional application these inner tubular elements or compartment-defining sleeves 37 are efficiently constructed with substantially complete avoidance of waste. Referring now to Fig. 2, I have there shown a short length of tubular wound veneering indicated in general by the numeral 40. It comprises a plurality of the veneer windings or layers 40a, 40b, 40c spirally or otherwise wound, about a straight longitudinal axis, the several layers or plies being bonded together into a substantially homogeneous unit, as for example in connection with the straight tubular elements of the parent application or the copending application previously identified.

This tube 40 is cut transversely, along the angularly related and oppositely inclined lines, for example as indicated in Fig. 2 by the broken lining at 41, etc. By equally distributing the cut lines 41 along the tube 40 a corresponding number of identical tubular sections 37 of the desired length are provided, alternate sections being oppositely positioned transversely in their initial positions in the tubular stock 40.

By then arranging any desired number of these sections 37 with their longer wall portions adjoining, they may be disposed in the angular or arced relation as seen in Fig. 1. The angle of inclination of the end cuts 41, and the length of the sections 37, may be variously selected as appropriate for the particular radius of curvature desired for the structure as a whole. Such truncate or segmental sections 37 may be directly abutted, and preferably bonded, end to end, or they may be assembled with intervening cross walls 38. They may be left hollow or they may be filled with and serve as covering for balsa or other filler material, similarly as for the straight tubular structures of the parent application. The curved tubular casing 36 may be formed in arcuate sections of any desired length, into which the tubular elements 37 are inserted, or such casing may be formed by winding the veneering or other strip material about the assembled sectional elements 37 and their end walls or spacers 38 where the latter are employed.

As previously stated, the method of the invention including the steps of angularly severing a length of straight lamellar veneer tubing into relatively short truncate sections and rearranging them to provide liner or chamber-defining means within a tubular casing, is applicable to instances where the tubular device or casing is completed through 360° of arc, to full circular form, as in Fig. 1, and also to structures of less than 360° arcuate extent. Any segmental or arcuate length of the outer tubular casing may be employed, as for example, in the formation of angular unions and connections between other tubing elements, as disclosed in the parent application.

Fig. 4 herein illustrates one such less than 360° arcuate structure, wherein the tubular casing 46 as a whole comprises substantially semicircular sections or end formations united by straight lengths 46', 46' to provide the main buoyant supporting frame or float for a raft or the like. The method of forming and assembling the liner or chamber-defining elements 37 for such semi-circular or other arcuate lengths, with or without cross-members or chamber end walls 38, has already been described with reference to Figs. 1 to 3. It is again noted that the angle of inclination for the end cuts 41, and the length of the sections 37 between such cuts is calculated in accordance with the radius of curvature for the particular arcuate tubular casing with which they are to be employed. In general, the less the curvature, the nearer the plane of severance between sections 37 approaches a plane perpendicular to their axis.

It will also be understood, as in the parent application, that at the ends of the casing elements such as 36 and 46 which enclose the sectionalized truncate members constructed and arranged in the manner described, the several layers or plies of the casing may be terminated in different transverse planes, for seating cooperation with the inner cross walls or for providing lapped joints for adjoining lengths or ends of the casing.

My invention is not limited to the particular steps for the practice thereof as herein illustrated or described, its scope being pointed out in the following claims.

I claim:

1. In the formation of tubular structures, the method which comprises winding plies of wood veneer about a straight longitudinal axis and bonding them together so as to form a tube of indeterminate length, severing the tube transversely along alternately oppositely inclined planes to provide a plurality of relatively short lengths of tubing, rearranging the severed lengths endwise in longitudinal series in angular axial interrelation, forming a curvilinear tubular casing by winding veneer stripping, interposing cross-walls between adjacent rearranged relatively short tubing lengths thereby to interconnect and provide end closures for the same, and disposing such lengths in the wound curvilinear casing.

2. That method of forming arcuate tubular structures having sectionalized inner liner or chamber-defining elements, which comprises winding a plurality of plies of wood veneer about a common axis and bonding them together to provide a straight tube, severing such straight tube transversely along alternately oppositely inclined planes spaced and inclined in proportion to the degree of curvature of the arcuate tubular structure to be formed, disposing the severed tube portions with their axes respectively perpendicular to selected angularly spaced radii of curvature so as to conform their respective axes substantially to the selected line of curvature, inserting end wall elements between said tube portions to form individual cells, and enclosing them in an arcuate tubular casing of the selected degree of curvature and of an internal diameter equivalent to the major cross dimension of the respective enclosed tube portions measured in the inclined transverse end planes thereof.

3. That method of forming curved lamellar veneer compartmental tubing which comprises the steps of winding and interbonding a plurality of plies of veneer into a straight tubular element, severing such element along equi-spaced alternately oppositely like inclined transverse planes to form a series of similar truncate tubular sections, inverting alternate sections, realigning such sections with their axes respectively perpendicular to selected angularly spaced radii of curvature so as to be generally confromant to the line of curvature desired for the tubing, installing and securing transverse wall elements between said sections to provide a series of closed chambers, and enclosing the whole in a lamellar veneer casing.

PAUL R. GOLDMAN.